(No Model.) 3 Sheets—Sheet 1.
P. D. HARTON.
CAKE MACHINE.
No. 516,648. Patented Mar. 20, 1894.
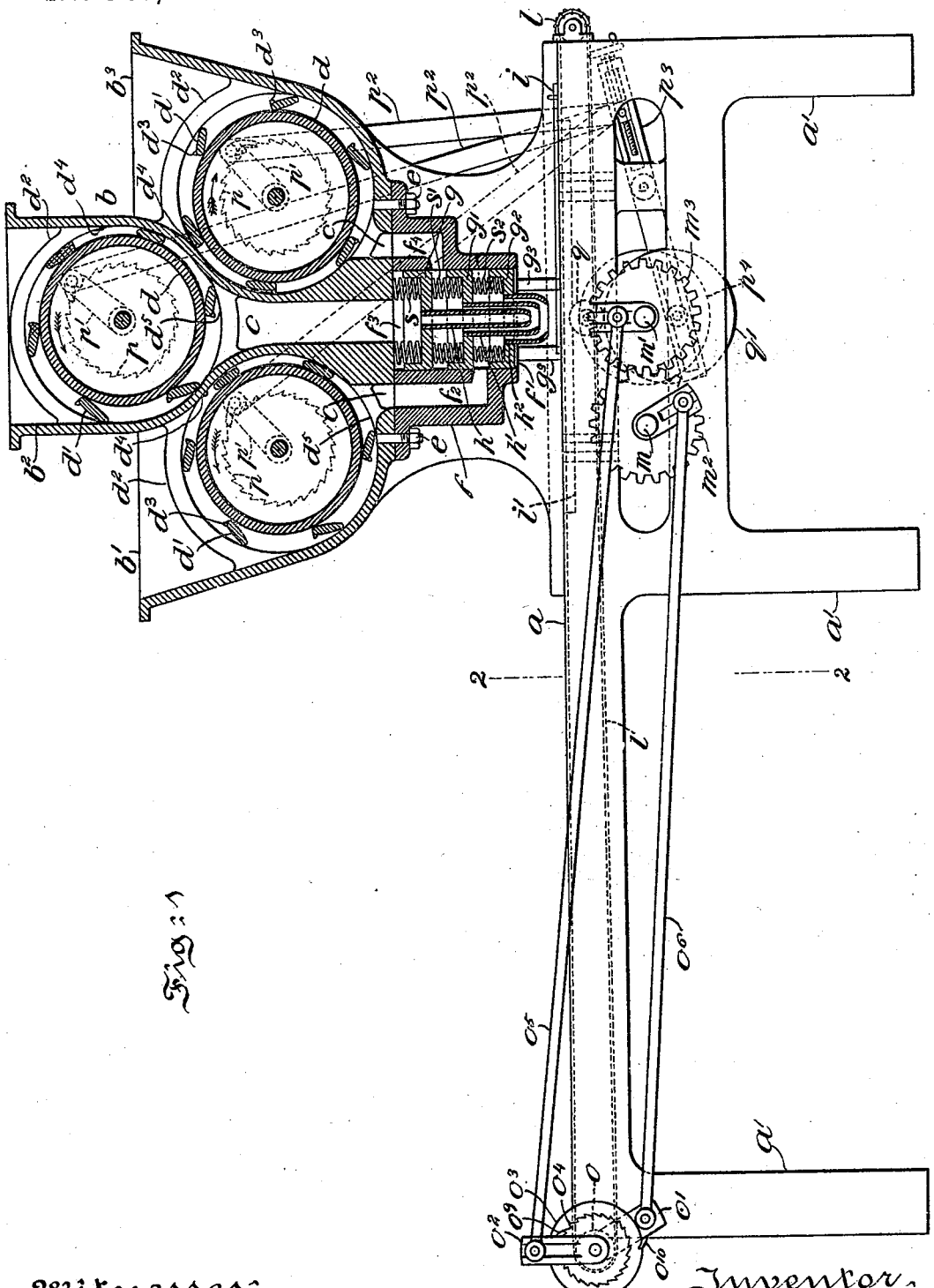
Fig: 1.
Witnesses:
Thomas M. Smith.
Richard C. Maxwell.
Inventor,
Pembroke D. Harton,
By J. Walter Douglas.
Attorney.

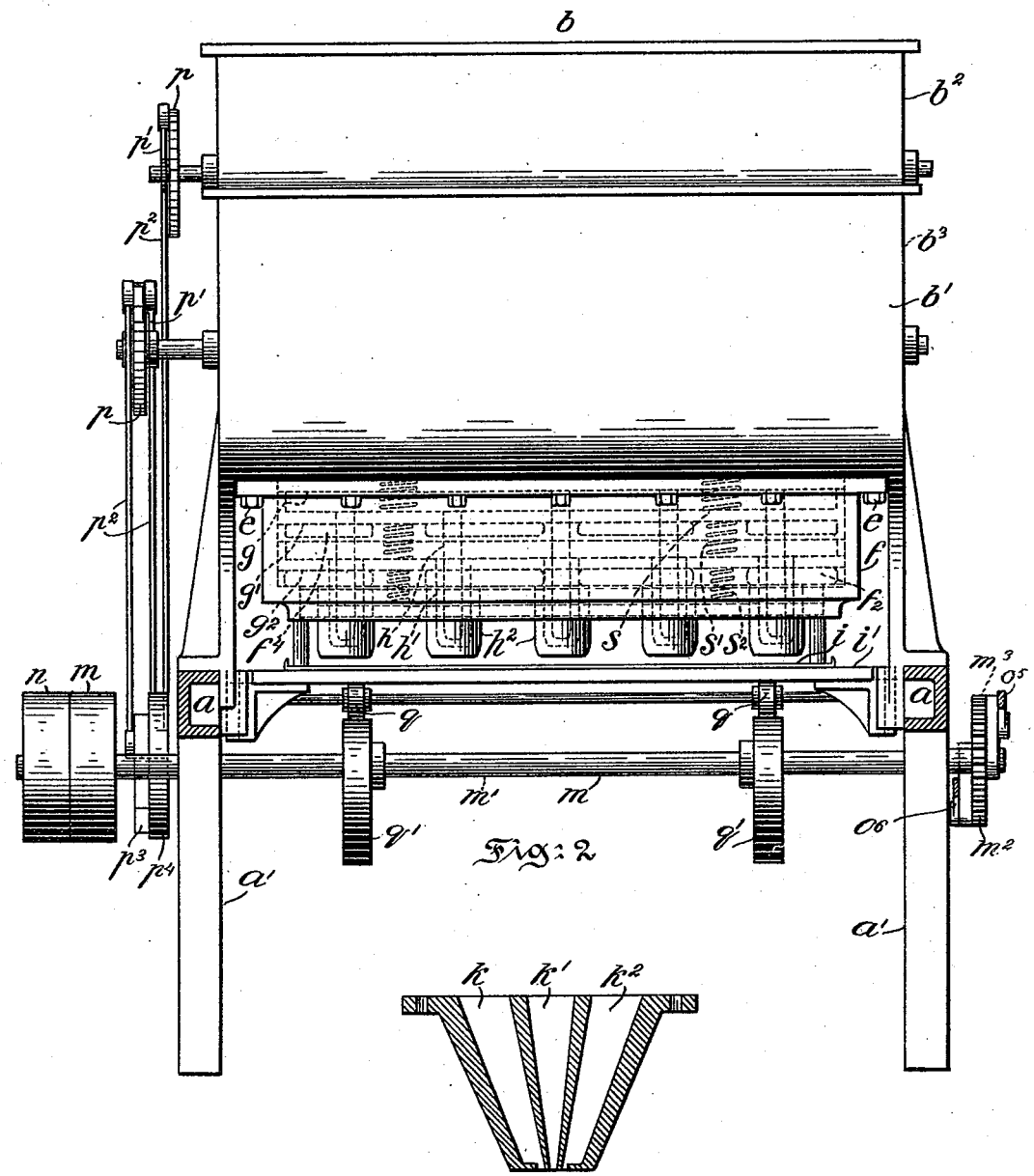

(No Model.) 3 Sheets—Sheet 3.
P. D. HARTON.
CAKE MACHINE.
No. 516,648. Patented Mar. 20, 1894.
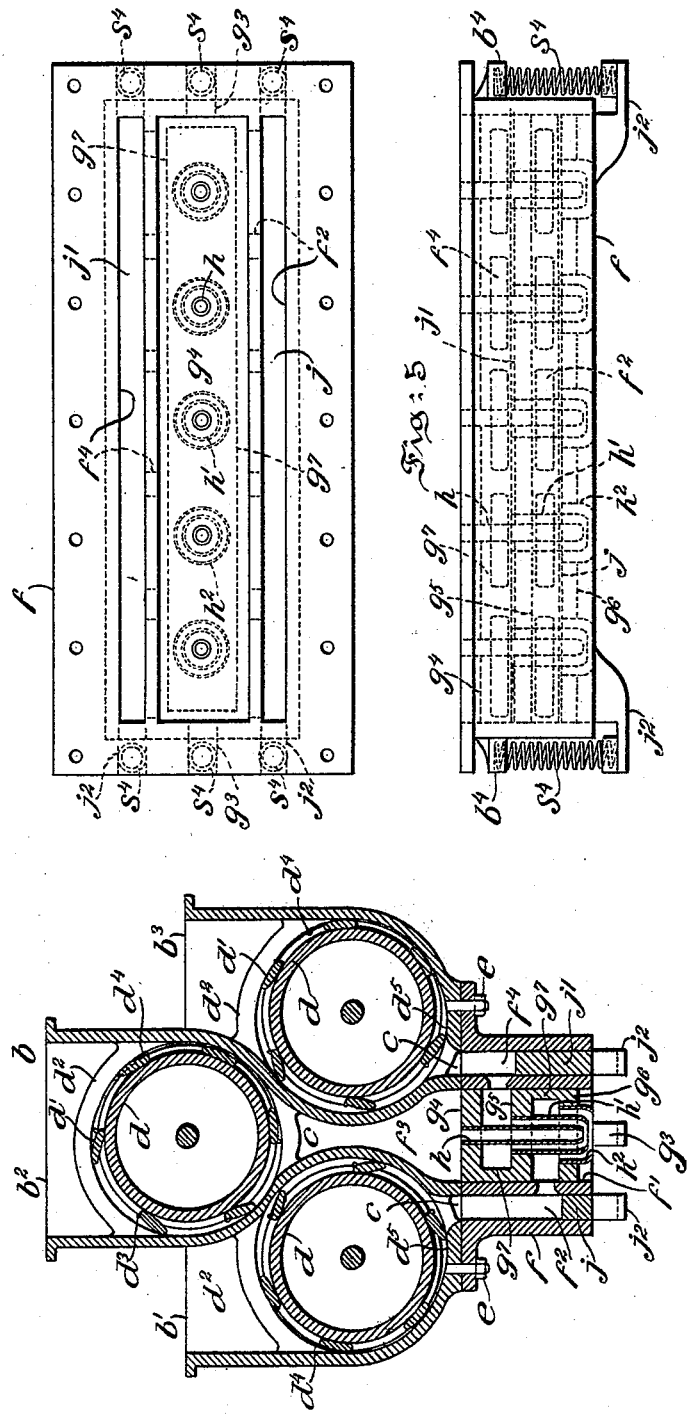

UNITED STATES PATENT OFFICE.

PEMBROKE D. HARTON, OF PHILADELPHIA, PENNSYLVANIA.

CAKE-MACHINE.

SPECIFICATION forming part of Letters Patent No. 516,648, dated March 20, 1894.

Application filed May 24, 1893. Serial No. 475,385. (No model.)

*To all whom it may concern:*

Be it known that I, PEMBROKE D. HARTON, a citizen of the United States, residing at the city of Philadelphia, in the county of Philadelphia and State of Pennsylvania, have invented certain new and useful Improvements in Cake-Machines, of which the following is a specification.

The principal objects of my invention are first, to provide a simple, durable, efficient and comparatively inexpensive machine for automatically depositing several kinds of dough or other material, as dough and jam or conserve in sheets, layers or strips or in the form of so-called drop-cakes with fruit, jam or similar material on top or within the body thereof; second, to provide a machine with two or more dough hoppers or reservoirs having nozzles or dies connected therewith and with suitable actuating mechanism for permitting of the automatic deposit of the sticky or glutinous mass in regulated or controlled quantity by the action of a movable table into different forms such as in sheets, layers or drop-cakes and in different colored or kinds of dough, jam or other material; and third, to provide a cake machine with two or more hoppers or reservoirs having means mounted therein for discharging different kinds of glutinous or sticky materials through nested nozzles communicating therewith and automatically controlled by the vertical movement of a table to deposit on detachable appliances connected therewith the different materials in sheets, layers or drop-cake form or the like.

My invention stated in general terms, comprises a cake machine provided with two or more hoppers or reservoirs having rotatable feed-rollers, nested discharge nozzles, molds or dies connected therewith, and actuated by the movement of a table to automatically deposit different kinds or colored materials onto a detachable appliance connected with a conveyer adapted to travel along over a table.

My invention further consists of a cake machine provided with two or more hoppers or reservoirs with feed-rollers and nested nozzles in direct communication with the hoppers or reservoirs and actuated by the vertical movement of a table to effect the deposit of the materials delivered from the hoppers or reservoirs.

My invention further consists of a cake machine provided with two or more hoppers or reservoirs with feed-rollers and having spring controlled discharge nozzles, dies or molds nested together and controlled by the movement of a table.

My invention further consists of a cake machine provided with a table actuated by suitable mechanism and having two or more hoppers or reservoirs provided with rotatable feed-rollers and with nested plunger nozzles, molds or dies connected therewith.

My invention further consists of a cake machine having hoppers or reservoirs provided with rotatable feed-rollers and with detachable plunger nozzles, dies or molds, the construction and arrangement being such that the substances or materials from the respective hoppers or reservoirs are automatically deposited by the movement of a table into contact therewith.

My invention further consists of a cake machine provided with two or more hoppers or reservoirs having feed-rollers and detachable spring controlled nozzles, molds or dies, the construction being such that the vertical movement of a table automatically controls the deposit of materials from the nozzles, molds or dies.

My invention further consists of a cake machine provided with a hopper having receptacles provided with rotatable feed rollers and a detachable casing provided with plunger nozzles, molds, or dies actuated by the vertical movement of the table of the machine to permit of the automatic deposit in regulated quantity of the materials from the respective nozzles, molds or dies; and my invention further consists of the improvements in cake machines hereinafter fully described and claimed.

The nature, characteristic features and scope of my invention will be more fully understood from the following description taken in connection with the accompanying drawings forming part hereof; and in which—

Figure 1, is a view partly in section and partly in side elevation of a cake machine embodying features of my invention. Fig. 2, is a sectional view taken on the line 2—2, of Fig. 1. Fig. 3, is a transverse sectional view of a nest of nozzles, molds or dies embodying a modification of my invention. Fig. 4, is a similar sectional view illustrating a slightly different or modified arrangement of certain of the parts shown in Figs. 1 and 2; and Figs. 5 and 6, are respectively front and top or plan views of the nozzles, molds or dies shown at the lower portion of Fig. 4.

In the drawings $a$, is the main-frame of the machine and $a'$, are the standards thereof.

$b$, is an open top hopper or reservoir mounted above the main-frame $a$, and provided with dough boxes. In the present instance three dough boxes $b'$, $b^2$ and $b^3$, are employed and each dough-box is provided with means for forcing the material fed in through the inlet at the open top thereof out through an opening as $c$, at the bottom thereof. Of course, various means may be employed for such purpose. However, in the present instance use is made of a feed-roller $d$, provided with pivotal paddles or wings $d'$. As the feed-roller $d$, revolves the paddles or wings $d'$, are turned into contact with a guide-rib $d^2$, and into open position for engaging the dough or other material, by means of pins or lugs $d^3$, adapted to collide with a projection $d^4$. Subsequently the front edges of the paddles or wings $d'$, collide with the side-wall of the dough-box as shown at $d^5$, and are thus closed, whereby the dough or other material is impelled or forced through the outlet $c$.

The nozzles, molds or dies and their accessories are located beneath the hopper $b$, and are detachably connected therewith by means of screws or bolts $e$, so that they may be readily removed and replaced by other nozzles, molds or dies adapted to produce other types, kinds or qualities of cakes.

In Figs. 1, 2, 4, 5 and 6, $f$, is a housing or casing provided with a central chamber $f'$, and with three sets of ports or channels $f^2$, $f^3$ and $f^4$, communicating respectively with the outlets $c$, of the dough-boxes of the hopper $b$.

In Figs. 1 and 2, $g$, $g'$ and $g^2$, are three plunger-plates afforded a range of up and down movement in the chamber $f'$, and provided with nozzles, molds or dies $h$, $h'$ and $h^2$ inserted in each other or nested together. These nozzles, molds or dies as illustrated in the above figures of the drawings are circular in form, but their form may be varied according to the required shape of the cake to be produced. The plunger plates $g$, $g'$ and $g^2$, are normally held under the influence of the springs $s$, $s'$ and $s^2$, in such manner that one of the dough boxes or hoppers, for example, the dough-box $b^3$, is in communication with the space between the upper and intermediate plates $g$ and $g'$; the dough-box $b'$, is in communication with the space between the intermediate and lower plates $g'$ and $g^2$; and the dough-box $b^2$, is in communication with the space above the upper plate $g$. In this connection it may be remarked that the springs $s^2$, $s'$ and $s$ are of increasing resiliency or strength in the order named and that the plate $g^2$, is provided with feet $g^3$, depending into range of a pan $i$, mounted upon the table $i'$, or of the table itself, so that when the table $i'$, is raised, as will be hereinafter described, the plates $g^2$, $g'$ and $g$, are raised in the order named. When the plates $g^2$ and $g'$, are raised they come opposite to and close the ports $f^2$ and $f^4$.

In order that the above described apparatus may be more fully understood, a description of its operation in the production of so-called pie biscuits or drop cakes having jam or other conserve interposed between top and bottom crusts, layers or cakes, will now be given.

The dough-box $b'$, contains material for the bottom crust or layer, the dough-box $b^3$, contains the conserve or fruit, and the dough-box $b^2$, contains dough for the top crust or layer. When the table $i'$, rises and presents the pan $i$, to the nozzles, molds or dies, the plate $g^2$, is lifted, thus closing the port $f^2$, and causing the dough for the bottom crust or layer contained between the plates $g^2$ and $g'$, to be forced out through the nozzle, mold or die $h^2$, and around the nozzle, mold or die $h'$. The plate $g'$, is then lifted, thus closing the port $f^4$, and causing the conserve or fruit contained between the plates $g'$ and $g$ to be forced out through the nozzle, mold or die $h'$, and around the nozzle, mold or die $h$, and to be deposited upon the previously formed bottom crust. As the table $i'$, continues to rise, the plate $g$, is lifted, thus causing the dough for the top crust or layer contained above the plate $g$, to be forced out through the nozzle, mold or die $h$, and to be deposited on top of the fruit or conserve. The table $i'$, then descends, carrying with it the formed cake or biscuit, and the plates $g$, $g'$ and $g^2$, are permitted to move under the influence of the springs $s$, $s'$ and $s^2$ into their normal positions, in order to permit a supply of cake making material to be forced from the dough-boxes above the respective plates $g$, $g'$ and $g^2$, in position for permitting of the repetition of the above described operation.

The construction and mode of operation of the apparatus illustrated in Figs. 4, 5 and 6, will now be described. In this instance the plunger plates $g^4$, $g^5$ and $g^6$ are connected with each other by means of webs $g^7$, and are moved as one piece by means of the feet $g^3$, that rest upon a pan supported by the table or upon the table itself and consequently constitute a plunger. Use is also made of plunger bars $j$ and $j'$, provided with feet $j^2$, disposed in range of the pan or table and adapted to be shifted upward into the ports $f^2$ and $f^4$, in order to force the substances or materials out of the nozzles, dies or molds $h^2$ and $h'$. The plunger bars $j$ and $j'$, and plates $g^4$, $g^5$ and $g^6$, are solicited downward by means of springs $s^4$, that engage brackets $b^4$, projecting from the end portions of the hopper $b$, as illustrated in Fig.

5, as soon as the table descends. In this connection it may be remarked that the springs $s^4$, for actuating the plungers are located outside of the machine and clear of the dough or other cake making materials which has been found advantageous in some cases.

The apparatus illustrated in Fig. 3, is adapted for attachment to the lower portions of the hoppers shown in Figs. 1, 2 and 4, by means of the screws or bolts $e$, and extends wholly or partially across the same. In this apparatus use is made of three nozzles, molds or dies $k$, $k'$ and $k^2$, as before described. The nozzle, mold or die $k$, communicates with the dough-box containing material for the bottom crust; the nozzle, mold or die $k^2$, communicates with the dough-box containing conserve or fruit, and the nozzle, mold or die $k'$, communicates with the dough-box containing material for the top crust. These cake making materials are forced through the respective nozzles, molds or dies $k$, $k'$ and $k^2$ solely by means of the feed wheels or deliverers $d$, of the dough-boxes and are distributed in the form of sheets upon movable pans. These sheets may comprise a top and bottom crust and an interposed layer of conserve and may be cut up into forms suitable for pies, biscuits or Washington cakes.

In the above described machines, the top and bottom crusts are wholly separate and may be composed of different qualities or kinds of materials especially adapted for the different purposes, thus insuring the production of economical and good cakes. Obviously by placing the fruit or conserve in the dough box $b^2$, it is possible to cause the same to be deposited on top of the cake.

Of course various types of mechanism may be employed for presenting the pans or other receptacles $i$, to the nozzles, molds or dies. In the present instance use is made of an endless conveyer $l$, and a table $i'$, susceptible of a range of upward and downward movements.

$m$ and $m'$, are shafts journaled in the main-frame $a$, of the machine, and geared together by means of gear-wheels $m^2$ and $m^3$.

$n$ and $n'$, are tight and loose pulleys by means of which power is applied to the shafts $m$ and $m'$. One of the guide-rolls $o$, of the conveyer $l$, is provided with pivotal arms $o'$ and $o^2$, having pawls adapted respectively for engagement with ratchet-wheels $o^3$ and $o^4$, connected with said guide-roll $o$. One of these ratchet-wheels $o^4$, is provided with a number of teeth and is operated by means of the arm $o^2$, and its pawl $o^9$, in order to cause the conveyer $l$, to present a pan or receptacle $i$, to the nozzles, molds or dies, in the production of cakes and in the manner above described. The other of these ratchet-wheels $o^3$, is provided with a single tooth and is operated by means of the arm $o'$, and its pawl $o^{10}$, in order to cause the conveyer $l$, to feed the pans or receptacles rapidly toward and away from the nozzles, dies or molds. The arm $o^2$, is operated by a link $o^5$, adjustably connected with a crank-arm on the shaft $m'$, and the arm $o'$, is operated through the instrumentality of a link $o^6$, adjustably connected with a crank arm on the shaft $m$.

The feed-wheels or deliverers $d$, of the respective dough-boxes or hoppers are provided with ratchet wheels $p$, and with pivotal arms $p'$, carrying pawls, for rotating them in the directions indicated by the arrows. These arms $p'$, are operated through the instrumentality of links $p^2$, adjustably connected with a rocker-arm $p^3$, actuated by a crank-pin and disk $p^4$, carried by the shaft $m'$. In some instances the table $i'$, is afforded a range of upward and downward motion, as has been stated in respect to Figs. 1, 2, 4, 5 and 6, and this result is accomplished through the instrumentality of rollers $q$, that run on cams $q'$, carried by the shaft $m'$.

When use is made of the apparatus illustrated in Fig. 3, the cams $q'$, may be dispensed with and the table $i'$, permitted to remain at rest.

Having thus described the nature and objects of my invention, what I claim as new, and desire to secure by Letters Patent, is—

1. A cake machine provided with spring controlled movable plungers and nested nozzles, molds or dies, hoppers or reservoirs, and rotatable feed-rollers, substantially as and for the purposes set forth.

2. A cake machine provided with hoppers having rotatable paddle feed-rollers, nested nozzles, molds or dies communicating with said hoppers, spring controlled movable plungers, a table and conveyer, and means for actuating said feed-rollers, table and conveyer, substantially as and for the purposes set forth.

3. In a cake machine, a hopper provided with dough-boxes having feed-rollers, a casing or housing detachably applied to said hopper and provided with ports or channels and with a chamber, plungers working in said chamber and carrying nested nozzles, molds or dies, springs for permitting said plungers to move in regular sequence, and a table adapted to actuate said plungers, substantially as and for the purposes set forth.

4. A cake machine provided with two or more hoppers or reservoirs having feed-rollers, and nested nozzles, molds or dies in direct communication therewith, a table and mechanism for actuating the same to cause by the vertical movement of the table, the materials from the nozzles, dies or molds to be deposited in forms or layers onto a receptacle therefor, substantially as and for the purposes set forth.

5. A cake machine provided with reservoirs having rotatable feed-rollers and nested discharge nozzles, molds or dies, springs of varying resiliency and strength connected with the same, plungers a table, and mechanism for actuating said feed-rollers and table, substantially as and for the purposes set forth.

6. A cake machine provided with two or more hoppers having rotatable paddle feed-rollers mounted therein, means for automatically controlling the movement of the paddles thereof, a detachable casing provided with channels, plungers, spring controlled nozzles, molds or dies, a table, and mechanism for actuating the same, substantially as and for the purposes set forth.

7. A cake machine provided with hoppers having rotatable paddle feed-rollers, a detachable casing provided with plungers, means movable in said casing and provided with nested discharge nozzles, molds or dies, and means for permitting of the automatic discharge of materials from said nozzles, molds or dies and actuating said paddle feed-rollers, substantially as and for the purposes set forth.

8. A cake machine provided with hoppers having rotatable feed-rollers with automatically operating paddles, a detachable casing provided with channels or spaces and spring controlled plunger nozzles, molds or dies, a table and means for successively actuating said rollers and table, substantially as and for the purposes set forth.

9. A cake machine provided with a hopper or reservoir having receptacles connected therewith and channels or chambers leading therefrom, rotatable paddle feed-rollers mounted in said receptacles, a detachable casing provided with channels or spaces and nested spring controlled plunger nozzles, molds or dies, a table provided with detachable pans, and mechanism for presenting said pans to said nozzles, molds or dies and for actuating said feed-rollers, substantially as and for the purposes set forth.

In testimony whereof I have hereunto set my signature in the presence of two subscribing witnesses.

PEMBROKE D. HARTON.

Witnesses:
THOMAS M. SMITH,
RICHARD C. MAXWELL.